May 28, 1957 J. T. MULLIN 2,794,066

SYSTEM FOR RECORDING AND REPRODUCING TELEVISION SIGNALS

Filed Nov. 14, 1950 7 Sheets-Sheet 1

INVENTOR.
John T. Mullin
BY
Lippincott & Smith
ATTORNEYS

May 28, 1957 J. T. MULLIN 2,794,066

SYSTEM FOR RECORDING AND REPRODUCING TELEVISION SIGNALS

Filed Nov. 14, 1950 7 Sheets-Sheet 2

INVENTOR.
John T. Mullin
BY
Lippincott & Smith
ATTORNEYS

May 28, 1957 J. T. MULLIN 2,794,066

SYSTEM FOR RECORDING AND REPRODUCING TELEVISION SIGNALS

Filed Nov. 14, 1950 7 Sheets-Sheet 3

INVENTOR.
John. T. Mullin
BY
Lippincott & Smith
ATTORNEYS

INVENTOR.
John T. Mullin
BY
Lippincott & Smith
ATTORNEYS

INVENTOR.
John T. Mullin
BY
Lippincott & Smith
ATTORNEYS

INVENTOR.
John T. Mullin
BY
Lippincott & Smith
ATTORNEYS

INVENTOR.
John T. Mullin
BY
Lippincott & Smith
ATTORNEYS

United States Patent Office 2,794,066

Patented May 28, 1957

2,794,066

SYSTEM FOR RECORDING AND REPRODUCING TELEVISION SIGNALS

John T. Mullin, Los Angeles, Calif., assignor to Minnesota Mining & Manufacturing Co., St. Paul, Minn., a corporation of Delaware Application November 14, 1950, Serial No. 195,612

11 Claims. (Cl. 178—6.6)

This invention relates to a system for transcribing television signals, or other signals having like characteristics, by phonographic methods.

In the sound broadcasting art it has frequently been found desirable to record program phonographically for reproduction at a later time. By the use of this procedure programs of unique events may be recorded when the event occurs and reproduced at times more convenient for auditors. Entertainment programs may be recorded at leisure and under favorable conditions, edited, and reproduced as finished performances which are exactly timed and with any errors or slips which may have been made during the production deleted. Programs may likewise be presented by stations not having facilities for direct wire connection to the point of origin. The use of transcribed programs has other advantages under special circumstances, and the sound recording art has so advanced that it is practically impossible to tell the difference between transcribed programs and live pick-ups.

The ability similarly to transcribe television programs would be of equal advantage to broadcasters. All methods of phonographic recording now known have, however, both mechanical and electrical limitations which have prevented phonographic techniques being used in the recording and reproduction of television signals. Hence, at the present time, where transcriptions of television programs are used, the recording is done by motion picture methods. The pictures to be recorded are displayed upon the face of a cathode ray tube as if for immediate viewing, the cathode ray screen is photographed once in each frame of the transmitted picture, the picture is developed, processed, and printed to provide a motion picture film of the program and is finally reprodced by rescanning the motion picture film to develop a new set of signals.

At each step of the process thus described there is a degradation in the quality of the picture. There is lost both detail and contrast. Pictures reproduced from such transcriptions are immediately recognizable as such by their relatively poor quality even when the greatest care has been taken in the transcription.

As indicated above, phonographic methods of recording and reproduction have not, in the past, been considered practical for recording of television signals. All methods of phonographic recording are limited as to the upper frequencies which they can produce, these limitations being imposed by the speed with which the recording medium can be moved or progressed past the recording or reproducing element, whether that element be a mechanically actuated needle, an optical slit, or the gap in a magnetic recording head. Although the details of the limitation and the way it actually operates to take effect may be different in the various methods of recording, the principles are essentially the same; there is a size limit beyond which an optical slit, an air gap, or a needle cannot be reduced, although these dimensions may differ in the cases mentioned. There is an upper limit beyond which the speed of a recording medium cannot be practically increased, either because the consumption of the medium would be so large that it cannot be satisfactorily handled or the production of such speeds involves mechanical difficulties which cannot be practically overcome. Whatever the nature of these limitations there will be some frequency at which the "record wave-length" becomes equal to the dimension of the recording element measured in the direction of motion, "record wave-lengths" being defined as the length along the medium required to record one cycle of the frequency involved.

In considering either the photographic method of recording which is customarily used in sound motion pictures or in the magnetic methods of recording, the practical minimum record wave-length which may be satisfactorily reproduced is in the neighborhood of 0.001", although it is to be understood that this is not a theoretical absolute but an approximate one established by the limitations of mechanical and maintenance practice. The frequency band involved in television transmissions under the standards now enforced in the United States extends from 60 cycles to 4 megacycles per second. To record the 4 megacycle frequency with a record wave-length of 0.001" would require a speed of recording medium of 4,000" or 333⅓' per second, and the bulk of either film or magnetic tape which would be required so to record even a few minutes program at this rate would be practically out of the question even if such problems as vibration, film flutter, and similar effects were disregarded. Even to record at half this rate would be a practical impossibility, maximum feasible recording speeds being somewhere in the neighborhood of 300" per second.

While present television standards contemplate the use of frequencies up to 4 megacycles, reasonably satisfactory pictures can be produced using a considerably narrower band. Pictures transmitted by coaxial cable do not, at the present time, generally reach these maximum frequencies, most of the cables now installed cutting off at 2.7 megacycles, and it is doubtful if any except the very best of the television pictures recorded on motion picture film contain frequencies in excess of 2 megacycles, even disregarding the other distortions introduced by the process.

The present invention is designed to overcome the limitations of phonographic recording methods so as to enable these methods to be empolyed in the recording of television signals or other signals having like general characteristics. The principles here set forth are applicable to any method of phonographic recording, mechanical, photographic, or magnetic, but because of the lightness, cheapness, and ability to record a large amount of information on a relatively small bulk of material and at the same time to provide records of high quality, and because faulty or out of date recordings can be erased and the medium re-used, the preferred technique is that of recording magnetically, using as the recording medium a tape of paper or plastic coated with a magnetizable oxide of iron. In the detailed description of the invention to follow it will be the magnetic method that is described. The equivalence of the various methods of phonographic recording is so well understood that anyone skilled in the art should be able to make the changes involved in adapting the invention to other recording methods should it be desired to do so for any reason.

Pursuant to the broad purpose of the invention as above indicated, among its objects are to provide a method of phonographic recording whereby frequencies may be reproduced which are higher than those having the minimum record wave-length which may be satisfactorily reproduced by the phonographic system employed; to provide a means of phonographically recording and reproducing composite television signals, including video, synchronizing, blanking, and equalizing signals; to provide a recording means and method which my be accurately synchronized with both the power supply at the recording or reproducing point and with the synchronizing signals used in the television transmission; to provide a means and method of frequency division whereby high frequency components of the signal to be transmitted may be converted into a plurality of signals each having a record wave-length within the readily recordable limit and from which the high frequency components may be recovered and recombined into a composite signal substantially similar to the original; to provide apparatus which, when manufactured within tolerances obtainable by presently known methods, will function to produce accurately television signals of the character described and which may be operated and maintained by personnel whose skill and training do not exceed that required for the operation of other television equipment; to provide equipment whose initial cost is within the range of that of recording equipment using motion picture techniques and whose cost of operation, including the cost of the recording medium, is much less; and to provide a system wherein the records produced may be immediately reproduced and edited.

Considered from the standpoint of the system as a whole the method of my invention comprises the generation of a timing wave, preferably of accurate sinusoidal form and of a frequency approaching the maximum which can be satisfactorily recorded and reproduced by the phonographic method chosen. This wave is preferably derived by frequency multiplication from the line repetition frequency used in the television system whose signals are to be recorded. In the United Sates, and under present standards, the timing signal is preferably produced by frequency multiplication from the 15,750 cycle line frequency which is usually tied in with the customary 60 cycle power supply, so as to bear a constant phase relation to the latter, although other methods of deriving the timing wave may be employed. The timing wave is fed to a transducer head and recorded as accurately as possible on the medium chosen, the latter being preferably in the form of a strip or tape of plastic moved longitudinally past the transducer head. A plurality of other transducer heads are spaced laterally across the tape, being ranged as closely as possible to permit each to develop a separate track, parallel to those of the other heads. Ideally these transducer heads might be ranged in a single row or bank, normal to the direction of motion of the tape. Actually, because of the necessary physical bulk of the heads, it is more feasible to array them in a plurality of such rows ranged in parallel relation across the path of the tape, the actual recording elements of the heads being staggered as between the rows so that each recording element traverses its own path without overlapping that of the others. It is also preferable to provide an additional head for recording the sound which accompanies most television programs.

A signal to be recorded is fed from a common source to all of the heads (except the timing and sound recording heads) through individual, parallel-connected circuits. Each of these circuits is provided with gating means which permits the passage of signals only when fed by a potential from some external source. Potentials for opening the gates are derived from the timing wave. The latter is fed to phase shifting means which derive from it a plurality of other waves of like frequency but differing in phase at successive increments equal in number to the gating circuits and totalling 360 electrical degrees. These phase displaced waves are converted into pulses of a maximum length which is substantially equal to that occupied by the increments of phase displacement. These pulses are fed, in succession, to the respective gates.

The gated circuits, including the transducer heads, are each arranged to record a relatively flat-topped waveform of timing frequency but varying in amplitude in accordance with the amplitude of each pulse passed by the gates. Various wave shaping circuits may be used to accomplish this, including condensers charged by the pulses and discharged just prior to receiving the next pulse. Preferably the transducer head circuits are designed to record each of the pulses as a flat topped pulse wave form which is approximately ½ cycle of the timing wave in length. Since only half-cycles are recorded and since these half-cycles are always in the same direction the maximum latitude in recording is obtained and certain difficulties are avoided by making the recording "downward from saturation" in the final record; i. e., if the recording method is magnetic, the medium (in the paths traversed by the video heads) is premagnetized to saturation and the half-cycles to be recorded are impressed in such direction as to desaturate the medium. In the case of photographic recording the exposure for minimum signal would start from zero, with increased darkening of the film up to the maximum signal within the latitude of the system; in this case the positive prints made from such a film would have maximum or saturated exposure at zero level. This method of recording produces distortion in the recorded wave form, but for the video signals to be reproduced this is unimportant. The recording head, however, should be biased as is customary for high quality reproduction and to produce minimum distortion in the form of the recorded signals.

The record thus made is reproduced by mechanism very similar to that used in the recording, but with certain important differences, the transducer heads are arranged in the identical order and spacing to those used in recording. The gating circuits, connecting the video transducer heads in parallel to a common circuit, are reversed in direction, feeding from the heads toward a common circuit instead of to the heads and away from the common or bus circuit. The timing wave which feeds the phase splitting circuits for developing the gating pulses is derived from the timing signal reproduced from the medium by the timing head instead of from the external source, but pulses of about the same length as those used in the recording process are fed to the gating circuits in the same order, these pulses being so timed that the gates are opened at the epochs of maximum amplitude of the semi-sinusoidal pulses, with the result that slight displacements in phase of these timing pulses have little or no effect on the amplitude of the signals passed. As a result of the successive opening of the gates the common video bus which connects to all of the gating circuits is fed by a series of pulses which collectively substantially reproduce the signal first recorded.

The foregoing will be more readily understood from the description of the preferred forms of the invention which follows, considered in connection with the accompanying drawings wherein.

Figure 1:
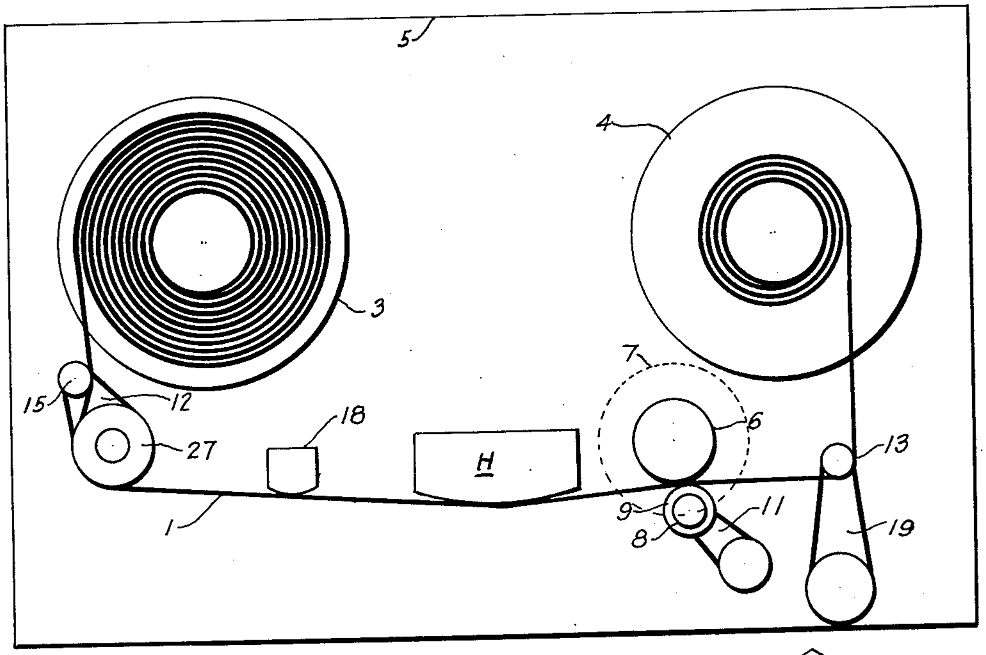
Fig. 1 is a plan view, largely schematic, of a recording equipment embodying the invention.

The equipment to be described contemplates the use of unperforated plastic tape of the general character as that now practically standard for high grade studio sound recording but preferably approximately three times as wide; i. e., from 0.7" to 0.75" in width. Such tape may be handled by standard drive methods with only minor variations in the actual driving equipment. This type of medium has the disadvantage that it does not lend itself to transmission synchronized with the power supply. It has the advantage of simplicity in that it does not require elaborate corrective circuits to compensate for stretching or shrinkage of the medium, or complex mechanical filters to eliminate sprocket-hole frequencies from the recorded or reproduced waves. It is to be understood, however, that by using say, a medium of the dimensions of single-perforated 16 mm. motion picture film, with the filters and speed corrective devices which have been developed for handling it synchronously for re-recording and "dubbing" purposes, synchronous operation can be attained. Since, however, such equipment is known, and since the drive mechanism is no part of this invention, the simpler non-perforated tape and drive therefor have been selected for the present purpose. A tape or film of the general character described is progressed past the recording heads by conventional equipment such as is illustrated, largely schematically, in Fig. 1. In this equipment a film 1 is shown as being transferred from a pay-off reel 3 to a take-up reel 4, both of which are mounted upon a table or panel 5.

The actual drive for the film is imparted by a capstan, which may conveniently be mounted directly or through a mechanical filter, upon the shaft of a synchronous motor, positioned behind the panel with its shaft projecting therethrough, this motor being indicated merely by the dotted circle 7. The film 1 is held against the capstan by an idler provided with a rubber rim or tire 9. The tire is urged against the capstan by a spring loaded arm 11. Somewhat similar arms 19 and 12, carrying idler rollers 13 and 15 respectively, serve to maintain the tape taut at all times. Tape 1 thus passes off of the take-up reel under the roller 15, around an idler pulley 27, thence past a D.-C. erasing head 18 and a group H of transducer heads to the capstan and finally over the tension idler 13 to the reel 4. Means (not shown) are provided for maintaining the tape under tension while accommodating the variation of the peripheries of the coils of tape on the reels; one such means comprises separate motor drives tending to rotate the reels in opposite directions. In this case reduced voltages are applied to these motors so that the tension placed upon the tape is slight and no harm is done to the pay-off motor by running it backward. All of this mechanism, with the exception of the heads themselves, is in accordance with current practice.

Figures 2, 3:
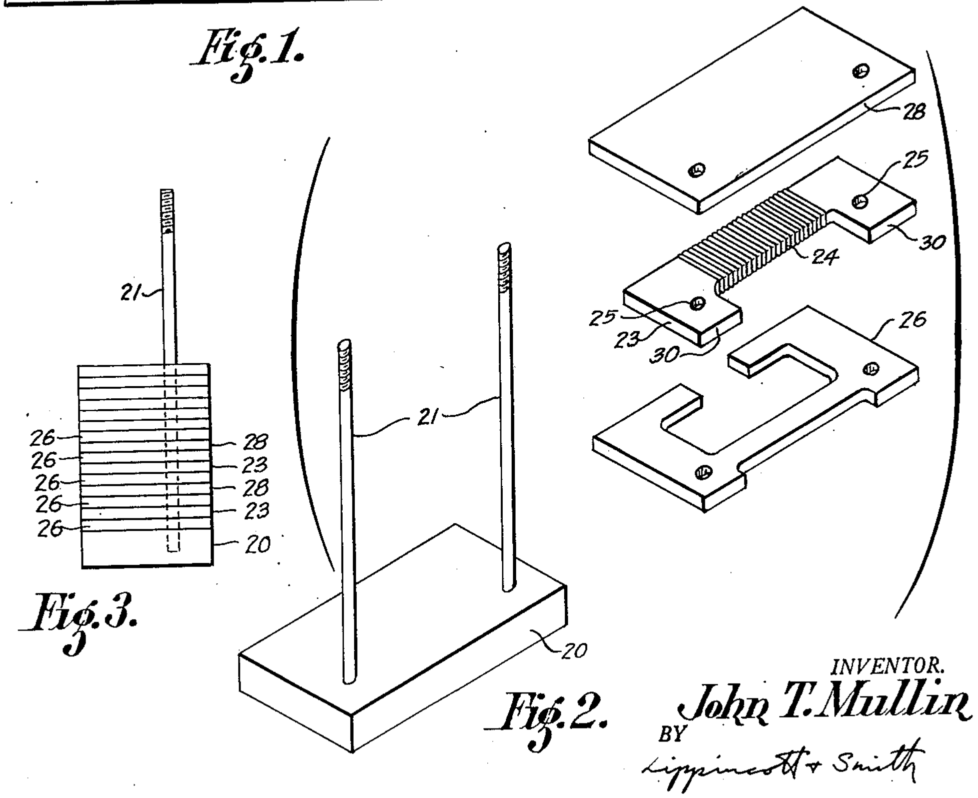
Fig. 2 is an exploded isometric view showing the elements of a transducer head.
Fig. 3 is an elevation of a partly assembled bank of transducer heads.

The method of construction of the video heads is best shown in the exploded view of Fig. 2. The heads are in banks. Each of the banks comprises ten accurately alined heads. These heads are made in two halves, only one of these halves being shown in Fig. 2. The construction and mounting of the heads requires the utmost precision in order that a record made on one machine may be reproduced accurately upon another. In assembling the four banks of video heads, therefore, a metal block 20 is provided with a pair of parallel locating studs 21 on which the various layers comprising the bank are threaded. The core of each half of each head comprises a single lamination of material such as high quality silicon electrical sheet punched in substantially the form indicated at the reference character 23 and provided with a winding of fine wire 24, each end of the lamination being provided with accurate spaced holes 25 for threading upon the studs 21. Each such lamination is flanked on both sides by a spacer 26 of nonmagnetic material, which is preferably slightly compressible, such as vulcanized fibre. This spacer is shaped somewhat like a block letter C, and is also provided with holes for threading on the studs 21. The thickness of the spacer is slightly greater than that of the winding 24, so that when the stack of heads is assembled and compressed it is the spacer which carries the compression and not the winding. Between each successive pair of heads is interposed a shield 28 which is preferably of highly conductive material such as copper or silver, whereafter the succession spacer, lamination, spacer, and shield is repeated until the stack of layers is completed. A second block similar to the block 20 is then placed on the top of the whole, nuts are threaded on to the ends of the studs and the stack is compressed to the required degree. Allowing 0.5" of tape width for recording the video signals, each stack of heads will be only ¼" wide, which allows 0.025" thickness per head and, since each head comprises four layers (including the thickness of the shield 28), the average thickness per layer is 0.006". Actually the shield may be thinner than the other layer, but in any event the stack is compressed until the total thickness, exclusive of the blocks 20, is precisely ¼". The whole assembly is then impregnated, preferably under vacuum, with a suitable material such as phenol-formaldehyde resin and cured so that the entire stack of laminations forms a solid mass. The pole faces 30 of the lamination are then ground and lapped to as accurate a plane surface as it is possible to produce. The stacks comprising the two halves of a single bank of heads are then assembled with the respective pole pieces facing each other, shims of a thickness corresponding to the desired width of the recording gap being interposed between the opposing pole faces.

For the conditions assumed in the present design the length of the gap should preferably be 0.001", although shorter gaps may be used under certain circumstances. The shim may be conducting; preferably copper, silver, or bronze. Once standardized upon, it is preferable that all of the heads, both those used for recording and reproducing, be constructed with the same length of gap, although this is not an absolute requirement.

Figure 4:
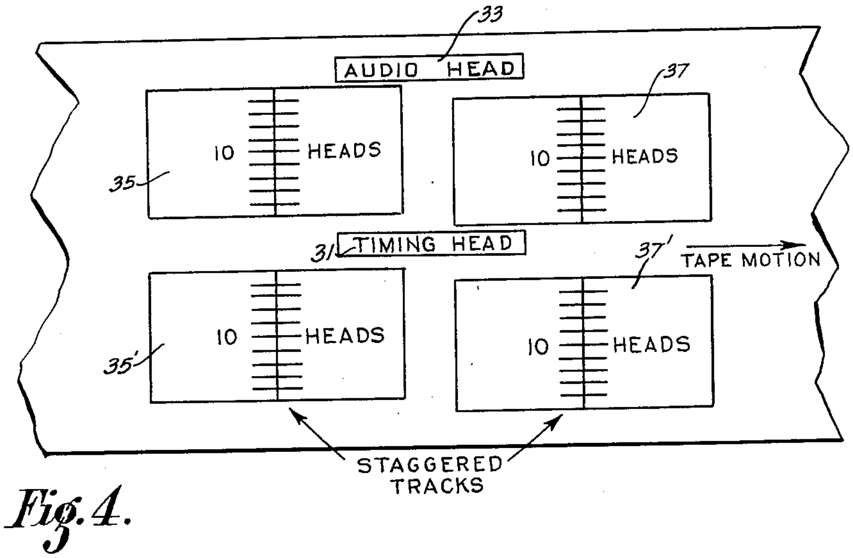
Fig. 4 is a diagram indicating the relative positioning of the various heads.

The heads are ranged across the tape in four banks, 35, 35' and 37, 37' as indicated in Fig. 4. A timing head 31 is preferably arranged intermediate the four banks; conveniently it may be of essentially the same construction as the forty video heads. An audio head 33 can be arranged on one side, also as shown. It may be of conventional construction with the exception of its narrowness, it also being formed with a core comprising a single thickness of sheet magnetic material. Immediately ahead of it there is positioned a high frequency erasing head 34, preferably having a much wider gap than the others.

The heads are so mounted that the gaps in the heads comprising the banks 35 and 35' are accurately alined with each other and the same is true of the banks 37 and 37'. The two sets of banks are displaced laterally with respect to each other, however, so that the paths traced by the gaps and by the cores of the heads of the second group of banks fall accurately between those traced by the heads of the first banks. Because of the thickness of the spacers and the shield this is readily possible.

The lateral alinement of the air gaps so that the two sets of banks are accurately parallel is a matter for micrometer adjustment. Micrometer mounting permitting adjustment in situ are possible; I prefer, however, to assemble all of the heads in micrometer jigs within a single casing and then mold the entire assembly into a single block, using, for the purpose, either a thermo setting plastic or a fusible alloy. The entire group of heads then becomes a single replaceable unit and accuracies of alinement within 0.0001″ are feasible, and, as will be shown hereinafter, this is sufficient to give recording and reproduction of the required quality.

Figure 5:
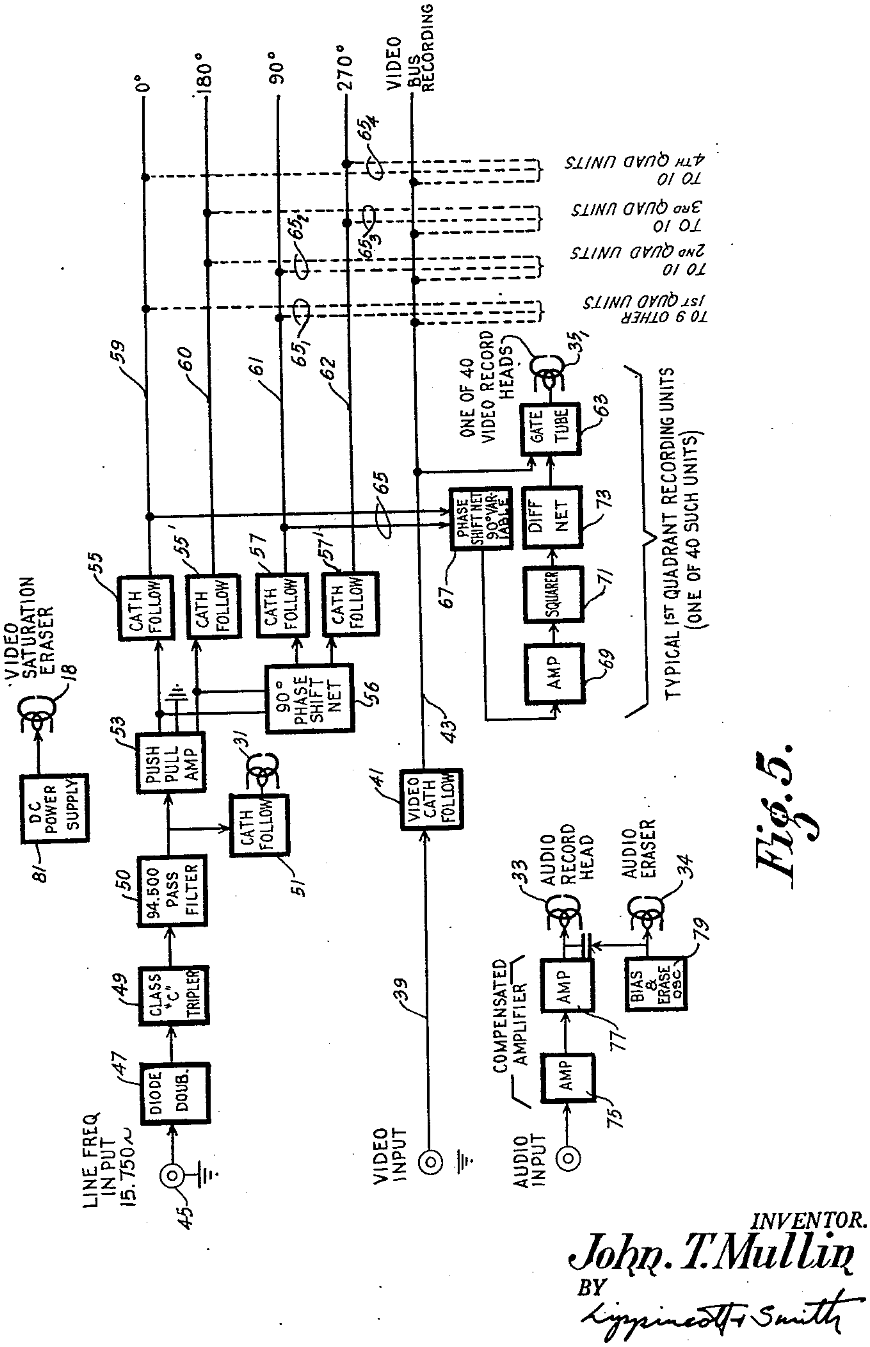
Fig. 5 is a block diagram of the components entering into a recording apparatus in accordance with this invention.

Fig. 5 indicates, in block form, the general layout of the recording equipment. Two sets of waves are supplied to the video portion of the apparatus; first, the video signal to be recorded is fed from the television camera to an input lead 39 and thence to a cathode follower 41 feeding a low impedance video bus 43 from which it is distributed to the various recording heads by equipment later to be described. The second frequency involved is a wave of line-repetition frequency, nominally 15,750 cycles under present standards. Actually this may vary slightly since the signal is derived from the normal sync generator of the television system and is, more accurately, 262½ times the frequency of the power system supply in the television station. This frequency is supplied to an input terminal 45 and then is passed first through a doubler 47, next through a frequency tripler 49 and finally through a narrow band-pass filter 50, tuned to select the resulting 94,500 cycle frequency and convert it into an accurately sinusoidal wave. This wave is supplied through a cathode follower 51 to the timing head 31. It is also fed to a push-pull amplifier 53. The output of this amplifier is split. A portion is fed to cathode followers 55 and 55′ in opposing phase. Another portion is passed through a 90° phase shift network 56 and thence to a pair of cathode followers 57 and 57′. The four cathode followers supply, respectively, four buses which carry the timing frequency relatively displaced by 90° in each of the buses 59, 60, 61 and 62.

Each of the video heads in the banks 35, 35′, 37 and 37′ is fed from the common video bus 43. In Fig. 5 one such head, $35_1$ is shown. The head is supplied through a gate tube 63, so that it receives a signal only when this gate tube is opened. Actuation of the gate is accomplished by signals derived from the quadrature timing wave buses 59 to 62. Ten heads derive their signals from each pair of buses, but these heads are preferably distributed between the four banks, as will be described in detail hereinafter. In the case of ten heads of the first quadrant the timing signals are derived from the first quadrant buses 59 and 61, each gate being fed through a circuit 65 through a variable phase shift network 67. The phase shift networks are individually adjusted so that the timing waves as fed to the gate tubes are displaced by successive increments of 9° from zero to 81°.

The rephased timing waves are thence fed through an amplifier 69 to a wave squarer 71, the squared waves are passed through a differentiating network 73 which converts the rise of the squared wave to a pulse of approximately ¼ microsecond duration, and the latter is applied to the gate. The remaining recording heads are fed through similar circuits, as indicated by the dotted lines designated as $65_1$, representing the circuits feeding the remaining nine heads of the first-quadrant $65_2$ representing the second-quadrant heads, $65_3$ feeding the third-quadrant heads and $65_4$ feeding the fourth-quadrant heads. The circuits represented by $65_2$ connect to the second-quadrant leads 61 and 60, $65_3$ to the third-quadrant leads 60 and 62, while the fourth-quadrant heads are fed by leads 62 and 59.

The phase shift networks in each group, corresponding to the phase shift network 67 in the unit shown in detail, are likewise relatively displaced by 9° increments, so that the entire forty heads represent relative phase displacements around one complete electrical cycle of 360°.

The remaining equipment of Fig. 5 is of a purely conventional type and comprises a sound recording circuit including a preamplifier 75 and a recording amplifier 77 which are connected in the usual manner to supply the audio recording head 33, the usual relatively high frequency biasing and erasing oscillator 79 which feeds both the audio head 33 and the erasing head 34. The latter demagnetizes the tape preparatory to the audio recording.

The remaining element of the recording system is the means for "erasing" or pre-saturating the tape for the video recording heads. This is indicated in the diagram as the single head 18 which is supplied by a constant direct magnetizing current from a suitable source 81. The saturating or erasing head may be a single magnet which is wide enough to pre-saturate the entire width of the film as traversed by all banks of video heads. Alternatively it may be divided into two or more such heads which collectively cover the area traversed by the video banks. Still another possibility is to use a permanent magnet for this purpose.

Figure 6:
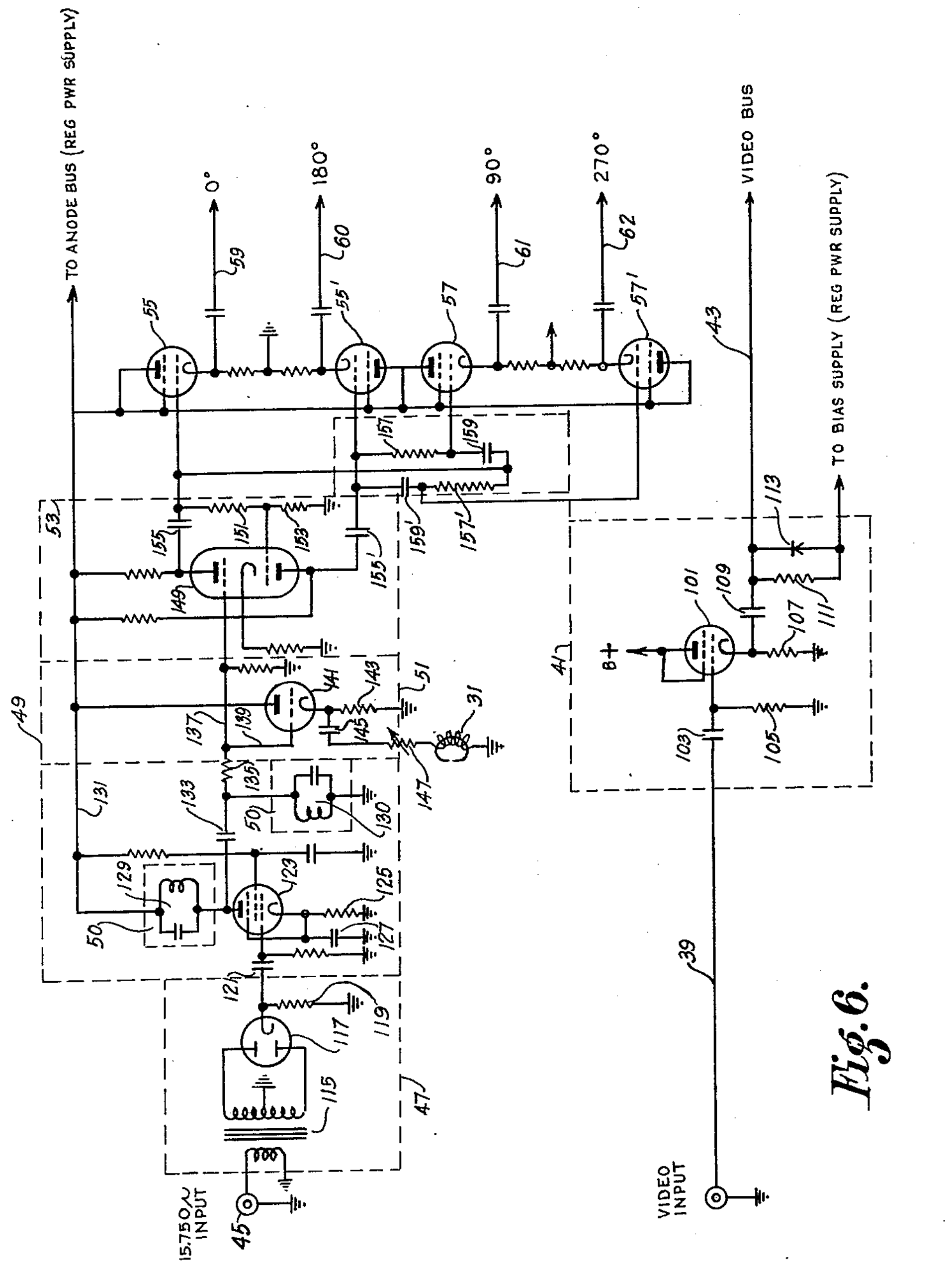
Fig. 6 is a schematic diagram showing, in greater detail, the apparatus of Fig. 5 common to all of the recording circuits.
Figure 7:
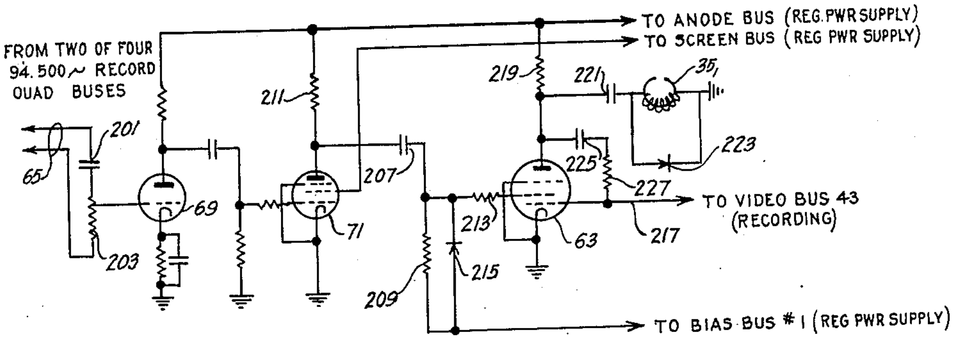
Fig. 7 is a schematic diagram of a single head circuit as employed in the equipment shown in Figs. 5 and 6.

Figs. 6 and 7 show schematically the one form which may be taken by the equipment comprised within the various blocks of Fig. 5, Fig. 6 being the schematic of the equipment which is common to all of the video recording units while Fig. 7 shows the makeup of one unit out of the forty here contemplated. In these two figures the reference characters used on the blocks of Fig. 5 are applied to dotted rectangles containing the elements comprised by these blocks.

Starting with the video input to lead 39 the cathode follower indicated by block 41 may be a power tube 101, such, for example, as a type 807 tube. The first grid of this tube is fed through a coupling condenser 103, the grid being biased by the usual resistor 105. The tube itself is shown connected as a conventional cathode follower, the video bus 43 being coupled to the cathode resistor 107 through a blocking condenser 109. This arrangement gives a low impedance, high power output connection capable of feeding all of the recording heads in parallel. The plate of tube 101 is supplied by a conventional power supply, indicated merely by B+. The video bus is biased, also from the conventional type power supply, through a resistor 111 in parallel with a clamping rectifier 113. All of this is substantially conventional.

The equipment shown in the remainder of the figure is that used to supply the timing wave and the four phase-displaced components derived therefrom. The 15,750 cycle input frequency from the terminal 45 connects to the primary of a transformer 115 having a secondary winding whose center tap connects to ground and its terminals connected to the anodes of a double diode 117. The potential at which the 15,750 frequency is supplied to the anodes is preferably of the order of 150 volts. The cathode of the double diode connects to ground through a resistor 119, which may have a value in the neighborhood of 100,000 ohms. There therefore appears across the resistor 119 a potential which pulsates at double the diode input frequency or 31,500 cycles. This potential is supplied through a coupling condenser 121 to the grid of an amplifier tube 123, preferably self-biased, approaching cut-off through a resistor 125 bypassed to ground through a condenser 127.

The tube 123 may be a receiving type pentode such as 6AK5. The grid drive is such as to carry it to saturation on the positive swings, and operated in this manner there will be developed in its output circuit a strong third harmonic of the 31,500 cycle input frequency. This frequency is filtered from the other output components of the tube by parallel tuned circuits 129 and 130, the circuit 129 connecting to the anode bus or the regular power supply through lead 131 while the tuned circuit 130 connects to the anode of tube 123 through a coupling condenser 133 and to ground. Both of these tuned circuits are resonated to the triple frequency of 94,500 cycles, and the resultant wave, fed through resistor 135 to lead 137, is of substantially pure sinusoidal form.

From lead 137 a branch 139 connects to the grid of a tube 141 which is connected as a cathode follower, through resistor 143 and the coupling condenser 145 to the timing head 31. The cathode follower is used for the purpose of matching the tube to the relatively low impedance of the recording head. Preferably there is also provided a variable resistor 147 for regulating the level at which the recording is made.

The lead 137 is connected to one control grid of a double triode 149. The other grid of this triode connects through the phase inverting circuit comprising resistors 151 and 153 and a blocking condenser 155 to the anode of the section of the double triode which is controlled by the grid first mentioned, so that the tube acts as a push-pull amplifier in a well known manner. Two anodes connect, in opposite phase, through condensers 155 and 155' to the control grids of the cathode follower tubes 55 and 55'. The two plates of the double triode 149 are also connected, respectively, through phase shifting circuits comprising resistors 157 and 157' in series with condensers 159 and 159', to the grids of the similar cathode follower tubes 57 and 57' as before mentioned. The cathode circuits of the four cathode followers connect through relatively large blocking condensers, which may be of the order of one microfarad in capacity, to the quadrature leads 59, 60, 61 and 62 as is generally described above.

Fig. 7 shows the connection of one of the recording units to the equipment shown in Fig. 6. The lead 65 of Fig. 5 connects to a condenser 201 and a potentiometer 203 in series. By employing a condenser of 100 micromicrofarads and a potentiometer resistance of 20,000 ohms a phase shift of about 50° may be obtained by varying the position of the potentiometer contact. By reversing the relative positions of resistor and condenser a similar shift may be obtained in the opposite direction, so that any relative phase over little more than a quadrant may be obtained by adjustment of the potentiometer contact. As has been described there will be a different setting of each phase shifting network for each unit, the relative phases between successive units being set 9° apart. The above described phase shifting circuits are illustrative; numerous modifications are possible which will give the required adjustable rotation. The potentiometer contact 205 connects to the grid of a conventional resistance coupled amplifier 69 which feeds in turn the wave squarer 71. The latter is merely a resistance coupled amplifier, preferably of the pentode type, the grid of which is swung by its input signal below cut-off and well above saturation. The result is a substantially square output wave, and because the linear characteristic of the tube is so far exceeded the relatively small variations in input amplitude resulting from the method of varying the input phase are of no moment. The plate of the wave squarer tube 71 connects to a differentiating circuit comprising a small condenser 207 and a fairly low value resistor 209 resistor in series. Reasonable values are, say, 20 micromicrofarads for the condenser and 5,000 ohms for the resistor. The positive pulses resulting from the fall of the squared current wave through resistor 211 in the plate circuit of tube 71, as these pulses appear across resistor 209, are applied through a protective resistor 213 to the screen grid of gate tube 63. The negative pulses resulting from the rise of current through resistor 211 are bypassed through a rectifier or clamp circuit 215. With the values mentioned the result is that a positive gating pulse is applied to the screen grid this pulse being of approximately ¼ microsecond duration.

The control grid of tube 63 is connected to the video bus 43 through lead 217. Tube 63 feeds the recording head in a manner which is designed to convert the ¼ microsecond pulses fed to the head into a form which will be reproduced as a flat-topped pulse of materially greater length. The anode of tube 63 is supplied with its direct current bias through resistor 219, connected between the anode and the anode bus of the conventional power supply. The head circuit comprises a blocking condenser 221, from which the head $35_1$ connects to ground. The head is bridged by a rectifier 223, such as a germanium crystal. There may also be provided a negative feed-back circuit comprising a coupling condenser 225 in series with a resistor 227, to improve the linearity of the tube response.

It has already been stated that the preferred length of gap in the head $35_1$ is 0.001", or one-half the record wavelength of the timing wave, and that tape has been premagnetized so that the negative pulses applied to the head are in such direction as to record downward from saturation. The ¼ microsecond pulse as applied to the head through the condenser will therefore demagnetize a segment of the tape which is equal in length to the gap in the recording head, plus the travel of the tape during the period when the pulse persists. During the length of the pulse the rectifier 223 offers a very high resistance so that the current resulting from the pulse flows almost entirely through the head. When the pulse in the plate circuit disappears there will therefore remain a charge upon the condenser 221. If reversed current were permitted to flow through the head to neutralize the charge it would tend to remagnetize the medium. In this direction, however, the rectifier is conducting and the current which re-establishes the equilibrium of the condenser is almost entirely by-passed around the head, owing to the relatively high impedance of the latter to the frequencies involved in the rapid decay of the pulse. As a result there is left upon the tape, for each pulse, a charge which is substantially uniform and is very approximately 0.001" long or one-half of the record wavelength.

Figure 8:
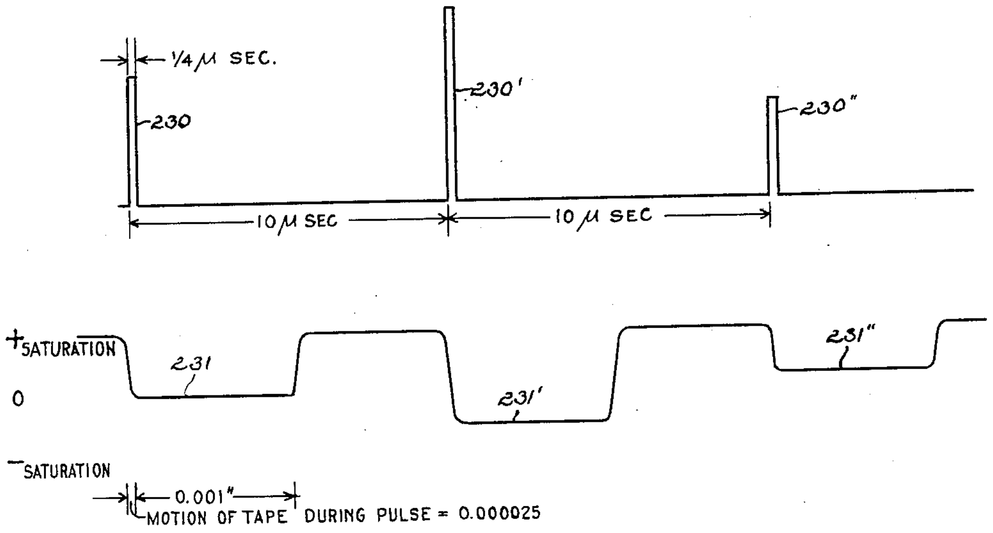
Fig. 8 is a diagram, somewhat idealized, of the waveform of the pulses supplied to the head circuit, plotted with respect to time, and the corresponding record as imposed on the tape, plotted with respect to space.

Fig. 8 is illustrative of the pulses as applied and as recorded, shown on the basis of a 100 kilocycle timing wave, which is very nearly that actually employed. The upper curve shows three successive pulses, 230, 230' and 230", each of a different amplitude, applied to one recording head at the 100 kilocycle rate, i. e., one pulse every 10 microseconds. The lower curve shows the corresponding magnetization of the tape, each pulse being spread out into an area of demagnetization slightly longer than the record wavelength. Owing to the motion of the tape and the fringing of the magnetic field at the gap (as well as to departure of the actual pulses from their theoretical wave form) the fall of the intensity of magnetization of the tape will not be instantaneous but will be rounded off somewhat, as shown. The rise of magnetization may also be rounded off, but may be somewhat steeper. Nevertheless there will remain an area of substantially constant demagnetization substantially ½ or .001" long. Following this will be a length of a little under ½ where the tape is in the saturated condition. This is followed at successive intervals in length by sections of demagnetization 231' and 231", of similar shapes but with amplitudes, respectively, proportional to the amplitude of pulses 230' and 230". It is to be understood that in the term "demagnetization" there is included magnetization in the opposite sense from the original polarization.

Figure 9:
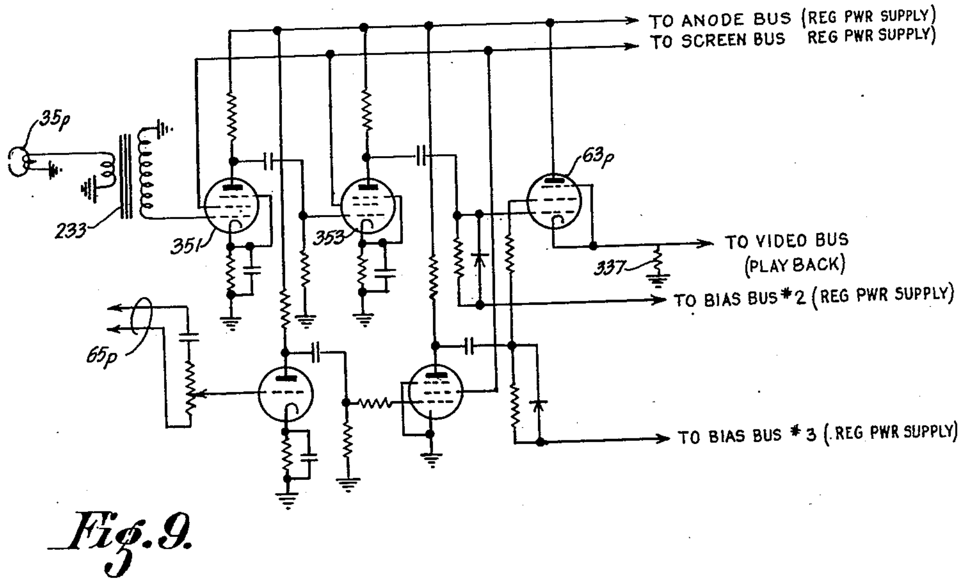
Fig. 9 is a schematic diagram of the circuit of a single play-back or reproducing head.

In playing back the pulses thus recorded, potential waveforms substantially similar in shape to the magnetic charges on the tape will be produced, provided the reproducing or playback head has a gap of the same length as that used in the recording. A schematic diagram of the circuit of one play-back head is shown in Fig. 9. The head $35p$ is connected to the primary of a transformer 233. As the reproduction is by electromagnetic induction the potential developed in the head is proportional to the rate of change of flux in the head coil. The flux in the coil is proportional to the magnetomotive force embraced by the gap in the recording head. This is equal to the degree of magnetization of the tape integrated over the length of tape embraced by the gap. As soon as the demagnetized area starts to enter the gap the flux through the coil starts to change, reaching a minimum when the entire length of the demagnetized area has entered the gap. Since the length of the demagnetized portion and the gap are substantially the same, the flux starts to increase again immediately, as the demagnetized area passes out of the gap. Since both decrease and increase in flux are at a constant rate, the result is the nearly rectangular wave shape which is desired.

It is to be noted that this effect occurs, as accurately as is described, only if the length of the gap and the demagnetized medium are equal. If one is longer than the other there will be an interval when the flux in the gap remains constant and the E. M. F. disappears. For very slight variations in gap length this is unimportant, but if materially different gap lengths were used for either recording or play-back different types of head circuits would be required to give the desired flat-topped output waveforms. Very narrow gaps and wave shaping circuits of known types may be used to accomplish the desired result, but I prefer the arrangement here described because of its simplicity and because of the latitude it permits in the adjustment of the recording and reproducing heads.

It will be seen that, as a result of the apparatus thus far described, there will be imposed upon the recording medium a series of forty parallel record tracks, each track comprising a series of magnetic charges which will be reproduced as substantially rectangular pulses, each 5 microseconds long. As recorded, the instants of rise of the successively gated pulses are separated by ¼ of a microsecond, and if absolute accuracy could be maintained in the construction of the equipment the instants of the rises in the successively gated tracks would be displaced longitudinally of the tape by a little over 50 millionths of an inch.

It must be assumed that the positioning of the gaps in both the recorder and the reproducer will vary from the theoretical norm. The deviation from the norm may occur in either instrument, and it may be in opposite directions in the two devices. Reproduction, as has been indicated, is accomplished by a sampling process very similar to that used in recording. While the relative positions of the various tracks cannot be maintained with the required degree of accuracy the reproduction of the timing wave can be, and so can the phase-shifting operation. The relative phases of the sampling pulses remains a constant since they are all derived from the one recorded timing wave, and even if the latter shifts slightly, due to "wow" in the driving mechanism, the phases of the sampling waves will all shift with it, together and in like degree. Hence what is necessary to produce satisfactory reproduction is that when sampling pulses occur to gate the respective playback circuits, a pulse of amplitude proportional to that of the original signal be present. Successful operation depends upon the reproduced wave being sampled at its maximum amplitude and since this amplitude persists for 0.001″ there is a tolerance of one-half thousandth from the norm in the positioning of the gaps in both the recording and the reproducing mechanisms. Tolerances of this order are possible with modern precision methods of manufacture and can be maintained by embedding all of the heads into a solid block of plastic or fusible metal as has been described, whereas tolerances of a much higher order of magnitude of this, as would be required if the signals had to be sampled at a definite point along the record tape would be mechanically impossible. By the use of the sampling technique the tolerances are increased nearly one hundred fold.

Figure 10:
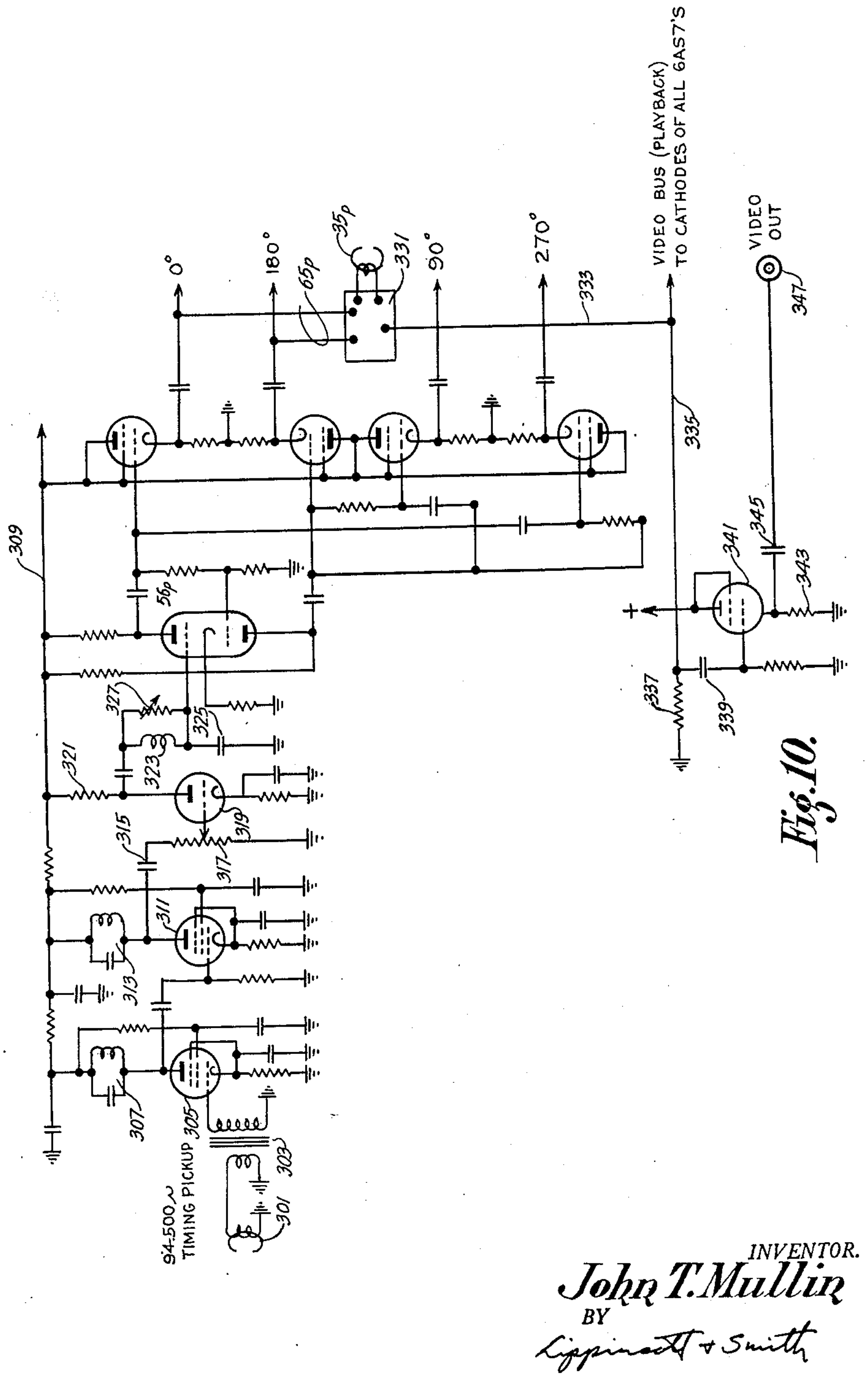
Fig. 10 is a schematic diagram of the portions of a reproducing circuit common to all heads.

One possible form of equipment used for redeveloping the timing wave for the sampling process as used in reproduction is illustrated in Fig. 10. As imposed upon the recording medium the timing wave is of the proper frequency, but, because of the presaturated condition of the tape, has a seriously distored waveform. A correspondingly distorted potential wave is therefore developed by the timing pickup head 301 and is fed to a step-up transformer 303. The secondary of this transformer connects from ground to the control grid of a pentode amplifier 305 having resonant circuit 307 connected between its anode and an anode bus 309 fed by a conventional power supply. The output of tube 305 is also fed to the grid of a second pentode 311, also supplied with a resonant output circuit Fig. 13. The resulting waveform, as delivered through coupling condenser 315 and a gain control potentiometer 317 to the grid of triode 319, is a substantially pure sine wave.

Tube 319 supplies the voltage developed across a plate resistor 321 to a phase shifting circuit including an inductor 323 in series with a condenser 325. The inductor is shunted by a variable resistor 327 which may be adjusted simultaneously to vary the phase of the reproduced timing waves so that each one will gate its respective pickup circuit at the proper epoch. The purpose of this is to delay the timing wave by ¼ cycle, so that, on the average, the reproduced pulses will be sampled in the middle, and full benefit of the permissible tolerances may be realized. The output of tube 319, phased as thus described, is applied to one grid of the phase-inverting push-pull tube 56. From this point on the circuit is identical with the phase shifting circuits of the recording mechanism and its elements are therefore identified by the same reference characters used in Figs. 5 and 6, distinguished by the subscript "*p*." Reproducing units are connected to the quadrature buses in the same manner and the same relative order as are the recording units.

One such playback unit 331 is indicated in block form in Fig. 10. The pulses developed by the pickup head 35$_p$ are gated in accordance with the timing wave as supplied through circuit 65$_p$ and the resultant pulses are supplied through lead 333 to a video bus 335. The composite signals thus derived from all of the pickup units are applied across resistor 337 and thence through coupling condenser 339 to the grid of a cathode follower output tube 341. The signals developed across the cathode resistor 343 passed through coupling condenser 345 to video output terminal 347, which may be connected to a standard television transmitter.

Much of the equipment in each of the playback units is identical to that in the corresponding recording units and hence is identified by the same reference characters with the subscript "*p*." The method of developing the phase shifting timing wave, squaring it, and differentiating it to provide the pulses which are used to gate reproduced signals are identical with those of the recording unit and therefore need not be again described. The signals themselves, consisting of the flat-topped waves developed in the secondary of transformer 233 are fed to the grid of a pentode amplifier 351. The amplified signals are delivered through the usual resistance-capacitance coupling network to a second amplifier 353. The output of the latter tube is connected to the control grid of the gating tube 63$_p$, and the cathode of the latter connects to the video bus and thence to ground through resistor 337 also shown in Fig. 10, this resistor serving for the cathode resistor for all of the playback units.

Figure 11:
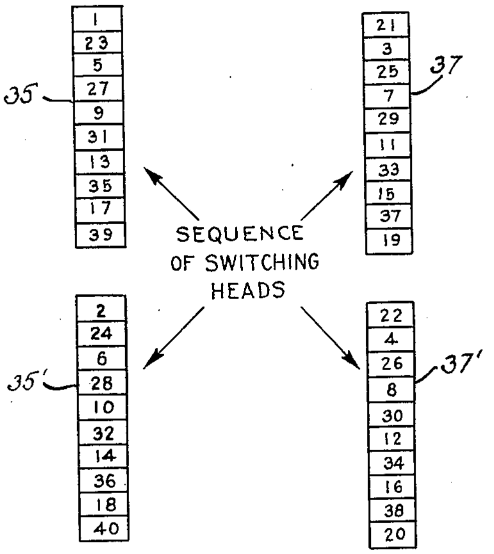
Fig. 11 is a diagram illustrative of a preferred sequence of switching or gating the transducer heads into the common video circuits.

One danger to be avoided in the equipment that has been described is cross-talk as between the closely adjacent heads and sound tracks. This danger may be eliminated almost entirely by insuring that the pulses on adjacent tracks are not at the high level at which they are sampled at the same time. One method of doing this is illustrated in Fig. 11 wherein each of the numbered blocks indicates one recording or reproducing head and the numbers within the blocks indicate the order in which they are switched. Other orders are doubtless possible which would accomplish the same result, but it is clear that in building the apparatus the same order should be maintained throughout the manufacture thereof so that recordings made on one apparatus may be reproduced upon any other.

It will be seen that each of the transducer heads is flanked by two others which are connected very nearly in opposite phase with respect to the timing wave. Due to the method of construction of the heads, accuracy of positioning, as between adjacent heads, will always be much greater than accuracy as between the various banks. The pulses developed are so nearly square that it is safe to assume that if sampling occurs at the peak of the wave as recorded under one head, the tracks under the two adjacent ones will be at saturation, which therefore provides a substantially constant datum. If this datum does vary, owing to cross-talk in recording, the variation will appear as a pulse of almost equal duration and of substantially constant level throughout the period when sampling may occur and hence will have minimum disturbing effect upon the overall signal. The eye has a much keener resolution for contrast than it has for absolute light level, although its latitude with regard to the latter is enormous. One db in level of overall illumination may be taken as substantially the lower limit which the eye can detect, and by staggering the switching of the heads as is indicated, cross-talk may be maintained below this level.

Cross-talk between adjacent tracks, as distinguished from actual induction between adjacent heads, is not an important factor. In the apparatus as described each head is .025" wide, while the actual lamination which does the recording is .006". Each track is therefore .006" wide plus any fringing that may occur and hence each track is flanked by a guard band which is also a trifle over .006" in width. Such fringing as does occur falls off to negligible proportions at distances from the track which are in excess of the length of the gap. Since, in the apparatus described, the fringing must extend six times this far before it is really effective to distort the output of an adjacent pick-up head, cross-talk due to this cause is entirely negligible.

The fringing which occurs at distances on each side of the heads which are less than the length of the air gap may be quite considerable. Actually this is of advantage since it permits slight "weaving" or lateral motion of the tape as it passes over the heads without materially reducing the magnitude of the output signals.

The apparatus as described may be used for recording the entire television signal, including not only the video information but also the blanking, synchronizing, and equalizing pulses which are transmitted with such information for controlling the television receivers. It is preferable that it be so used, although by synchronizing the tape by means of a sprocket drive and its accompanying control mechanism, as has been mentioned above, it can be employed to regenerate only the video information itself, the other signals being developed by the synchronizing signal generator at the transmitter from which the reproduced signal is being sent. With the record speeds and number of heads here described the resolution obtainable is one-half of the theoretical resolution of signals transmitted under present standards as the number of elements transmitted is only four million per second whereas the theoretical resolution using a band width of 4 megacycles is ½ cycle of the highest transmissible frequency or eight million per second.

Such reduction of resolution is a general characteristic of sampling systems. It can be overcome to a large extent by using sampling pulses of ⅛ microsecond duration and alternating the relative position in the scanning lines of these pulses in successive frames. This requires using a slightly different timing wave, derived from an odd harmonic of one-half of the line frequency instead of an even harmonic of a line frequency itself. For example, the eleventh harmonic of the half line frequency would result in a timing wave having a frequency of 86.5 kilocycles. This would give a record wave length of 0.0023" instead of the 0.0021, provided the 200" per second feed were maintained. This would permit slightly greater tolerances (about 10%) in the construction of the heads, provided the gaps were increased proportionally. On the other hand it would permit a reduction of record speed by the same percentage if the same tolerances were maintained. The theoretical resolution of the system would be increased by nearly 85% at the expense of slightly greater complexity in the equipment for generating the timing wave.

Each of the elements going into the apparatus as described may take a large number of forms within the spirit of this invention. While recording heads of the type here described are believed to be the most practical, many other types have been described in the literature and practically any of these could be modified to record wave lengths of the type here contemplated. Notable among these other types of heads are those in which the recording medium passes through the gap, producing polarization perpendicular to the surface of the medium instead of longitudinal thereof. The difficulties in applying such heads to the system here described are purely mechanical and not fundamental to the system. Amplifiers, of course, take a multiude of forms. Gating circuits are known wherein the gating potentials are applied to the cathode, anode, or inner grid instead of to an outer one, the signal, in the latter case, being applied to a grid more distant from the cathode. All such modifications are well within the ability of one skilled in the electronics or recording arts. The possibility of using photographic methods of recording have already been mentioned.

Figure 12:
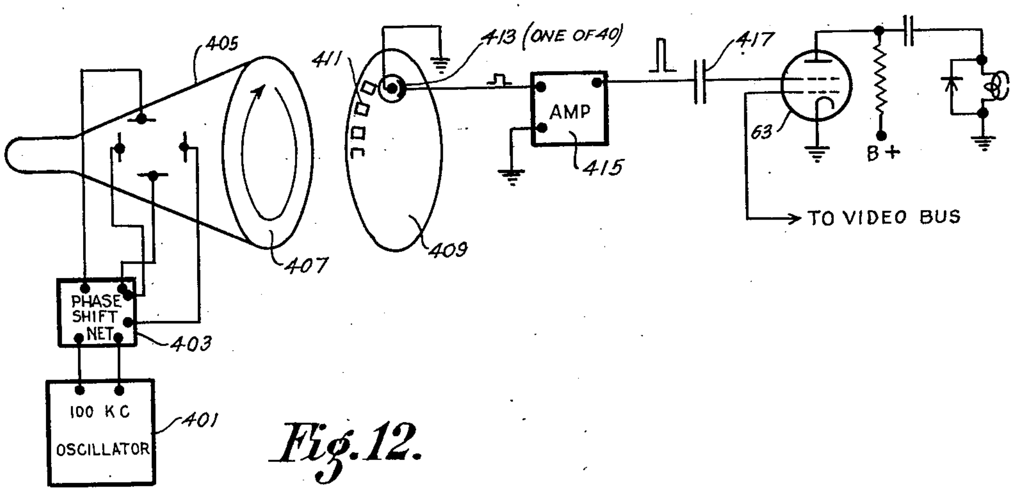
Fig. 12 is a diagram showing a modified type of switching system.

The derivation of the keying pulses as applied to the gates on both recorder and playback forms of the device can also take a large number of forms, one of which is illustrated in Fig. 12. In this case the timing wave developed by any of the methods already suggested is fed from an oscillator 401 to a phase shifting network 403 to split it into equal quadrature components, and in this case the phase shift network may be resistance-inductance, resistance-capacititance or a combination of the two, many such networks also being well known in the art. The quadrature components are fed to deflecting plates (or coils) of a cathode ray tube 405 to produce a circular sweep of the unmodulated beam of the latter. The tube itself may be of almost any of the forms which have been developed, but the phosphor used on a screen 407 of the tube should be of a short persistence type. A mask 409 is disposed in front of the screen, this mask being provided with 40 apertures 411, disposed in a circle of substantially the same radius as that described by the beam on the target of the cathode ray tube. Alternatively these apertures could be narrow sectors of a circle. Each aperture may, for example, be 4.5 degrees of arc in width, which would produce the ⅛ microsecond keying pulses required for the dot-interlace method of recording.

Behind each aperture, so as to be illuminated by light passing through it from the screen of the tube, is a photocell 413, the output of which is connected to an amplifier 415. The output of the amplifier connects through a coupling condenser 417 to the gating electrode of a tube 63, whereafter the circuit may be the same as that already described. That shown is the one used for recording and its elements are distinguished by the same reference characters as are used in Fig. 7.

Practically all of the parameters mentioned throughout the specification may be varied. Usually the recordings will be made at the point or origin of the television signal or the program to be recorded, but for monitoring or other purposes it may be desired to do the recording at some other point. If the device is to be used on received signals which are already somewhat degraded in detail or on signals for reproduction on other than broadcast standards the number of transducer heads and the speed at which the record is progressed may be correspondingly reduced without further degradation of the signal. With increased precision of manufacture or increased tape speeds higher sampling rates may be used and increased detail obtained in the reproduced signal. All such modifications are contemplated as within the scope of this invention and I do not wish to imply any limitation not expressed in the claims which follow.

I claim:

1. A system for providing transcriptions of television, or like signals occupying a wide band of frequencies including components of higher frequency than those reproducible by conventional sound-recording methods, comprising means for progressing a tape of recording medium at a substantially constant speed, a plurality of transducing heads positioned to be apposed to said medium and arrayed transversely thereof so that said heads trace closely adjacent separate parallel paths therealong, said heads including a timing head and a plurality of video heads, a timing circuit connected to said timing head, a separate circuit connected to each of said video heads, a common video bus, gating means connecting each of said separate circuits and said video bus and operative to transfer signals therebetween only when fed with pulses from an external source, means connected to said timing circuit for splitting timing waves existing therein into similar waves of accurately displaced phase, means actuated by said split-phase timing waves for supplying to each of said gating means pulses recurring at timing-wave frequency, the pulses supplied to each gating means being displaced in time with respect to those supplied to the others and the time displacement between pulses supplied to successive gates being substantially equal to the period of said timing wave divided by the number of said video heads.

2. Apparatus in accordance with claim 1 wherein each of said pulses is substantially equal in duration to the time displacement between pulses supplied to successive gating means.

3. Recording apparatus in accordance with claim 1 including means connected to said timing circuit for developing a timing wave of substantially sinusoidal form and of a frequency equal to the highest to be reproduced by said system divided by the number of said video heads.

4. Apparatus in accordance with claim 1 wherein each of said transducing heads comprises a core of magnetic material provided with a gap therein and a winding on said core, said core being so positioned with respect to the path of said recording medium that the portion thereof including the gap is in contact with the medium when the latter is in place.

5. Recording apparatus in accordance with claim 4 including means for applying a substantially saturating unidirectional magnetic bias to the portion of said medium contacted by said video heads.

6. Apparatus in accordance with claim 1 wherein said phase splitting means comprises a 90° phase shifting network, timing potential busses connected to said timing circuit and said network so as to provide four potentials differing in phase by successive 90° displacements, and means actuated by said displaced potentials for providing potentials of like frequency displaced in phase by successive equal increments totalling 360 electrical degrees.

7. Apparatus in accordance with claim 6 wherein said potential actuated means comprise four similar groups of adjustable phase shifting networks, the networks of each group being connected to a different successive pair of said timing potential busses.

8. Apparatus in accordance with claim 7 wherein said potential actuated means comprise a cathode ray tube, ray deflecting means for said tube connected to said busses to provide a substantially circular sweep of a cathode ray beam developed therein, a mask having a plurality of substantially equal apertures therein substantially uniformly spaced in a circle, said mask being disposed with respect to said tube so that said apertures are traversed by the circular sweep of said cathode ray beam, and a photoelectric cell positioned behind each aperture of said mask to be illuminated once in each sweep of said cathode ray beam and thereupon develop a current pulse.

9. Apparatus for providing transcriptions of television or like signals occupying a wide band of frequencies including components of higher frequency than those reproducible by conventional sound recording methods, comprising means for progressing a tape of recording medium at a substantially constant speed, a plurality of transducing heads positioned to be apposed to said medium and arrayed transversely thereof so that said heads trace closely adjacent separate paths therealong, said heads including a timing head and a plurality of video heads, a timing circuit connected to said timing head, a separate circuit connected to each of said video heads, a common video bus, gating means connecting each of said separate circuits and said video bus and operative to transfer signals therebetween only when fed with pulses from an external source, means connected to said timing circuit for deriving from timing waves existing therein trains of pulses of repetition frequencies equal to the frequency of said timing waves and of accurately displaced phase, connections for supplying to each of said gating means an individual train of pulses recurring at timing wave frequency, the pulses supplied to each gating means being displaced in time with respect to those supplied to the others and the time displacement between pulses supplied to successive gates being substantially equal.

10. Apparatus in accordance with claim 9 wherein said pulse forming means is adapted to supply pulses which are substantially equal in duration to the time displacement between pulses supplied to successive gating means.

11. Reproducing apparatus for television or like signals magnetically recorded as a plurality of tracks on a common medium, said tracks being representative of waves of a common frequency, and nonuniform amplitudes, the waves as recorded on the various tracks being relatively phase-displaced by substantially uniform increments and the amplitudes of the crests of the recorded waves being a function of the instantaneous amplitudes of the signals to be reproduced at successive epochs corresponding to the phase-displacement of the recorded waves, which comprises: a plurality of transducer heads adapted to be apposed to the recorded tracks, means for progressing said medium past said heads at a substantially uniform rate, means connected to one of said heads for deriving therefrom a timing wave of said common frequency, means for developing from said timing wave a plurality of trains of pulses of the same fundamental frequency and phase displaced with respect to each other by increments substantially equal to the phase displacement of said recorded waves, a plurality of gating means each having input terminals connected to a corresponding transducer head, second input terminals connected to actuate the gating means by the one of said trains of pulses the occurrence whereof corresponds substantially with the crests of waves generated in the transducer head connected to the individual gating means and output terminals; and a common circuit connected to the output terminals of all of said gating means.

References Cited in the file of this patent

UNITED STATES PATENTS

| | | |
|---|---|---|
| 1,771,360 | Thurm | July 22, 1930 |
| 1,867,542 | Hammond | July 12, 1932 |
| 2,406,350 | Harrison | Aug. 27, 1946 |
| 2,427,421 | Rieber | Sept. 16, 1947 |
| 2,517,808 | Sziklai | Aug. 8, 1950 |
| 2,698,875 | Greenwood | Jan. 4, 1955 |

FOREIGN PATENTS

| | | |
|---|---|---|
| 832,168 | France | Sept. 22, 1938 |